United States Patent [19]
Kinoshita et al.

[11] 4,057,495
[45] Nov. 8, 1977

[54] METHOD FOR TREATING A WASTE WATER CONTAINING A NONIONIC SURFACE ACTIVE AGENT

[75] Inventors: Mototaka Kinoshita, Chiba; Akio Okabe, Tokyo; Susumu Ando, Chiba, all of Japan

[73] Assignee: Lion Fat & Oil Co., Ltd., Japan

[21] Appl. No.: 724,254

[22] Filed: Sept. 17, 1976

[30] Foreign Application Priority Data

Sept. 17, 1975 Japan .................. 50-112417

[51] Int. Cl.² ........................... B01D 21/01
[52] U.S. Cl. ........................ 210/44; 210/45; 210/56
[58] Field of Search ........... 210/44, 59, 60, 221 R, 210/51, 52, 53, 56, 73 R, 63, 70–72, 45

[56] References Cited
U.S. PATENT DOCUMENTS 3,898,159  8/1975  Okabe et al. .................. 210/44

FOREIGN PATENT DOCUMENTS 2,361,620  8/1974  Germany .................. 210/44
74-66568  8/1974  Japan.

OTHER PUBLICATIONS

Chem. Abstract 84:21784 h "Removal of Nonionic Surfactants from Waste Water"; (1976).

Primary Examiner—Thomas G. Wyse
Assistant Examiner—Benoit Castel
Attorney, Agent, or Firm—Bacon & Thomas

[57] ABSTRACT

A method comprises in combination a step of effecting treatment by a foam separation method and a pressure/heating step for effecting treatment in the presence of an inorganic electrolyte, thereby recovering a nonionic surface active agent from a nonionic surface active agent containing waste water, while at the same time purifying the waste water.

5 Claims, 1 Drawing Figure

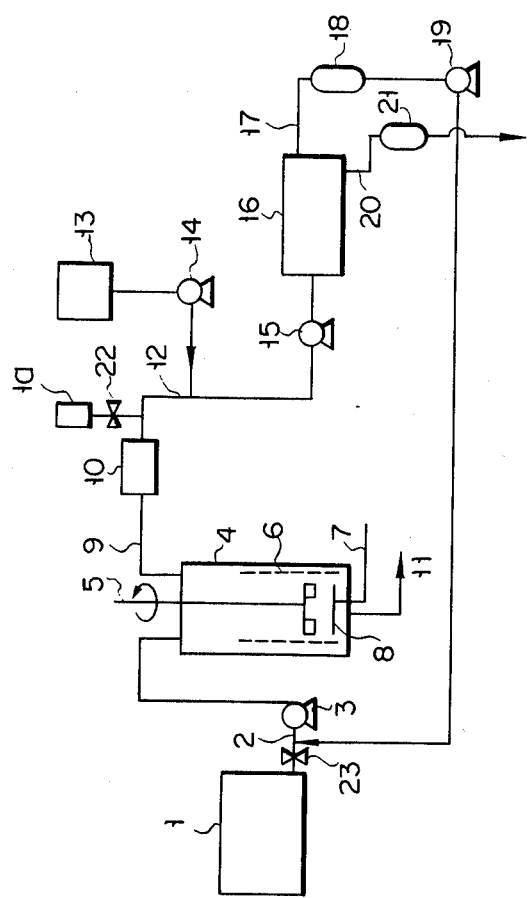

METHOD FOR TREATING A WASTE WATER CONTAINING A NONIONIC SURFACE ACTIVE AGENT

This invention relates to an improved method for treating a waste water containing a nonionic surface active agent and in particular a method for treating a waste water containing a nonionic surface active agent, comprising in combination a step for effecting treatment by a foam separation method and a pressure/heating step for effecting treatment in the presence of an inorganic electrolyte.

A waste water containing a surface active agent is increasingly discharged from a household in general and a variety of factories or works. The discharge of the waste water into a river etc. destroys the environment, causing water contamination and providing the difficulty in utilizing the waste water as industrial water for reuse. A nonionic surface active agent is widely used in a wide field such as the textile industry, agricultural chemicals industry, dye industry, washing etc. and an increasing amount of nonionic surface active agent is used yearly, presenting the problem as to how the waste water should be treated. A variety of methods such as a physical method, chemical method, biological method etc. have been attempted as a way for treating a waste water. As a method for treating a waste water containing a nonionic surface active agent in particular, it is known to remove a nonionic surface active agent from the waste water by adding water-soluble inorganic salts (Japanese Patent Disclosure No. 66568/74). It is also known to remove a nonionic surface active agent from the waste water by adding a mineral acid to the waste water and heating the resultant water (Japanese Patent Disclosure No. 56060/75). However, these methods recover about 70% at maximum of the nonionic surface active agent with the consequent lowered recovery. A considerable amount of nonionic surface active agent and inorganic salts or mineral acid are contained in the treated water separated from the surface active agent and the treated water can not be reused in that condition or dischargd in a river as it is. Since the latter method involves treating the waste water in the presence of an acid, consideration should be given to a countermeasure against corrosion of the device.

Another method is to remove a nonionic surface active agent from a waste water by concentrating a nonionic surface active agent containing waste water by a foam separation process, heating the concentrated solution to a temperature above its clouding point and cooling it (Japanese Patent Disclosure No. 56744/75). This method permits no recovery of a high concentration nonionic surface active agent and the rate of recovery is lowered dependent upon the kind of the nonionic surface active agent, presenting the difficulty of utilizing the treated water for reuse. In view of the above, no excellent treating method has so far proposed to treat a surface active agent containing waste water due to the characteristic of the nonionic surface active agents, i.e., since much surface active agent is materially stable and it is not easily subjected to biodegradation etc.

It is accordingly the object of this invention to provide a method for readily recovering a high concentration nonionic surface active agent from a nonionic surface active agent containing waste water, while utilizing a treated waste water for reuse.

In one aspect of this invention there is provided a method for treating a nonionic surface active agent containing waste water, comprising in combination a foam separation step for effecting treatment by a foam separation method and a pressure/heating step for effecting treatment under pressure at 100° to 200° C after adding an inorganic electrolyte so that more than 50 ppm of the inorganic electrolyte is contained.

In another aspect of this invention there is provided a method in which a high concentration nonionic surface active agent is recovered in high yield, while the waste water is treated to obtain an industrial water for reuse.

This invention can be more fully understood from the following detailed description when taken in conjunction with the accompanying drawing, in which:

FIG. is a flow sheet diagrammatically showing a process according to the method of this invention.

A method of this invention can be divided by the content of a nonionic surface active agent in a waste water into two modes. One mode is the case where use is made of a waste water (a low concentration waste water) containing less than 500 ppm of a nonionic surface active agent and the other mode is the case where use is made of a waste water (a high concentration waste water) containing 500 ppm or more of a nonionic surface active agent.

In the first mode, a waste water (a low concentration waste water) is divided by a foam separation process into a concentrated water containing more than 500 ppm of a nonionic surface active agent and a treated water containing less than 3 ppm of a nonionic surface active agent. An inorganic electrolyte is added to the concentrated water so that the content of the electrolyte is more than 50 ppm. The water was heated under pressure to 100° to 200° C to divide it into a high concentration nonionic surface active agent and a water (hereinafter referred to as a separated water). The separated water is recycled in the foam separation process or recycled in the foam separation process after it is mixed with the waste water.

In the second mode, an inorganic electrolyte is added to a waste water (a high concentration water) to be treated so that the content of the electrolyte is more than 50 ppm. The water was heated under pressure to 100° to 200° C to divide it into a high concentration nonionic surface active agent and a separated water. The separated water is divided by a foam separation process into a concentrated water containing a nonionic surface active agent of more than 500 ppm and a treated water of less than 3 ppm. Then, the concentrated water is either recycled in the above-mentioned pressure/heating process or recycled in the pressure/heating process after it is mixed with the high concentration waste water.

In the method according to this invention a different sequence is given to the foam separation process and pressure/heating process dependent upon the amount of nonionic surface active agent contained in the waste water. That is, where less than 500 ppm of the surface active agent is contained, the foam separation process and pressure/heating process are effected in this order and the separated water obtained through the pressure/heating process is recycled to the foam separation process. Where 500 ppm or more of the surface active agent is contained, the pressure/heating process and foam separation process are effected in this order and the concentrated water obtained through the foam separation process is recycled to the pressure/heating process.

The foam separation process of this invention is a process to which is applied a known foam separation method for treating a usual waste water (U.S. Pat. No. 3,898,159). A foam is formed by forcedly stirring an introduced air etc. by a turbine impeller mixer which is used to facilitate effective foam formation.

It is desirable that in order to further improve foam dispersion a draft tube comprising a cylindrical screen having a diameter greater than a diameter of a turbine impeller should be provided outside of the turbine impeller (U.S. Pat. No. 3,915,887). The diameter of the foam varies dependent upon the dimension of a foam separation tower, but it is desirably of the order of 1 mm. A waste water containing a surface active agent of less than 500 ppm can be easily divided by the foam separation method into a concentrated water containing a surface active agent of more than 500 ppm and a treated water of less than 3 ppm. The pressure/heating process of this invention is to add more than 50 ppm of an inorganic electrolyte to the waste water and heat under pressure the resultant water to 100° to 200° C. The reason why more than 50 ppm of an inorganic electrolyte is used is ascribable to the fact that for less than 50 ppm the nonionic surface active agent under pressure and heating shows a low rate of separation and in consequence the efficiency of the following foam separation process is lowered. This tendency is more prominent if there are a high mol number of added ethylene oxides in the molecules of the nonionic surface active agent. Even if the added inorganic electrolyte exceeds 500 ppm, the nonionic surface active agent shows no improved rate of separation. Rather, much of the inorganic electrolyte is mixed into a recovered nonionic surface active agent or a treated water. Usually 50 to 500 ppm, preferably about 200 ppm, of the inorganic electrolyte is added, though it varies dependent upon the kind of nonionic surface active agent in the waste water. As a preferred inorganic electrolyte the following can be listed by way of example: Sulfates such as $NaSO_4$, $K_2SO_4$, $Al_2(SO_4)_3$, and $Fe_2(SO_4)_3$ and chlorides such as $NaCl$, $KCl$, $CaCl_2$, $MgCl_2$, $FeCl_2$, $FeCl_3$ and $AlCl_3$.

The reason why the heating temperature in the pressure/heating process is restricted to 100° to 200° C is due to the fact that if the treatment is effected under pressure at a temperature of below 100° C, the nonionic surface active agent shows a low rate of separation and the separation efficiency is lowered in the following foam separation process. For a temperature exceeding 200° C the nonionic surface active agent is pyrolized, making it impossible to reuse it. The preferred temperature is at about 120° to 150° C. Although no restriction is made to the pressure applied at the pressure/heating process, a pressure of 2 to 5 kg/cm² is usually used.

By the nonionic surface active agent contained in the waste water to be treated according to this invention is meant ethylene oxide series in particular which is represented by the following general formula:

1. polyoxyethylenealkylether $$RO-(CH_2-CH_2-O)_nH \quad (1)$$

2. polyoxyethylenealkylphenylether

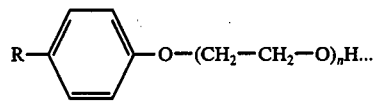

3. fatty ester of polyethylene glycol $$R-COO-(CH_2-CH_2-O)_nH \quad (3)$$

where $R = C_6$ to $C_{24}$ alkyl radical or alkenyl radical and $n = 2$ to 40.

The method of this invention will now be described by referring to a flow sheet.

A waste water tank 1 contains a waste water (a low concentration waste water) including 5 to 500 ppm of nonionic surface active agent. When a valve 23 is opened, the waste water in the tank 1 is supplied by a pump 3 to a foam separation tower 4 through a pipe 2. A stirrer 5 is mounted within the foam separation tower 4 and the waste water is stirred by the rotation of the stirrer. A cylindrical draft tube 6 formed of a stainless steel screen is provided between the inner wall of the tower 4 and the stirrer 5 so as to enhance a foam dispersion effect. A pipe 7 for introducing a compressed air is provided at the bottom of the tower. The pipe 7 is adapted to blow an air through an air diffuser tube 8 into the waste water in the tower 4, facilitating the formation of foam. The form of the concentrated nonionic surface active agent is floated at the upper level of the tower 4. Where the foam has a greater breaking strength, the foamed waste water is supplied through a pipe 9 to a foam breaker 10 such as a basket type centrifugal separator etc., where the foam is broken to become a concentrated water. Where the foam has a small breaking strength, it is not necessary that it be passed through the foam breaker 10. The nonionic surface active agent in a treated water 11 at the bottom of the foam separation tower 4 has a concentration of less than 3 ppm and in consequence the treated water can be discharged into a river or reused for industrial water, since it is harmless to a human being and animals.

An inorganic electrolyte is supplied by a pump 14 from an inorganic electrolyte tank 13 to the foam-broken concentrated water 12 so that its concentration becomes 50 to 500 ppm. A powdered inorganic electrolyte may be added directly to the concentrated water 12 without using the inorganic electrolyte tank and pump. Where a predetermined amount of inorganic electrolyte is dissolved in the concentrated water, it is not necessary to add a fresh inorganic electrolyte.

The concentrated water including the inorganic electrolyte is supplied by a pump 15 to a pressure/heating separation tank 16 where it is heated by steam etc. to more than 100° C. The pressure/heating treatment permits the concentrated water to be separated into a solution 20 having a nonionic surface active agent concentration of about more than 90% and a separated water 17 having a nonionic surface active agent concentration of 100 to 500 ppm (in this case, the treated water becomes 100 to 500 ppm irrespective of the nonionic surface active agent concentration before the pressure/heating treatment.) The separated water has the pressure to be returned at a flash tank 18 to atmospheric pressure and it is supplied through a pump 19 and pump 3 to the foam separation tower 4 together with the waste water from the waste water tank 1. The nonionic surface active agent solution 20 settled at the bottom of the pressure/heating separation tank 16 is returned to atmospheric pressure at a flash tank 21 and recovered for reuse. In this case, the surface active agent has a concentration of more than 90%.

Where a waste water (a high concentration waste water) having a greater amount of nonionic surface active agent (500 ppm or more) is treated, the inorganic electrolyte supplied through the pump 14 from the inorganic electrolyte tank 13 is added to a waste water supplied through a valve 22 from a waste water tank 1a. The mixed waste water is supplied through the pump 15 to the pressure/heating separation tank 16 where it is subjected to a heating treatment and separated into a solution 20 having a nonionic surface active agent concentration of more than 90% and a separated water 17 having a nonionic surface active agent concentration of 100 to 500 ppm. The separated water has the pressure returned at the flash tank 18 to atmospheric pressure and it is supplied by the pumps 19 and 3 to the foam separation tower 4 through the pipe 2. The separated water is subjected to a foam separation treatment at the foam separation tower 4 and then subjected to a pressure/heating treatment as mentioned above.

As will be apparent from the above-mentioned explanation the low and high concentration waste waters can be simultaneously treated according to this invention.

EXAMPLE 1

A waste water of a fiber treating agent containing 5200 ppm of a nonionic surface active agent of polyoxyethylenealkylphenylether was diluted with water to obtain three samples, a first sample containing 20 ppm of a nonionic surface active agent, a second sample containing 100 ppm of a nonionic surface active agent and a third sample containing 400 ppm of a nonionic surface active agent. The sample was supplied at a rate of 300 l/Hr to the 500 l foam separation tower 4 equipped with a stirrer 5 in the Figure, while at the same time an air compressed by a compressor is introduced through the pipe 7 at a rate of 50 l/min into the bottom of the foam separation tower. The sample was stirred by the turbine impeller mixer 5 to effect foam separation. A No. 20 stainless steel cylindrical screen was disposed around the turbine impeller. A treated water was taken out together with a foamed solution. The foamed solution was supplied through the pipe 9 to the foam breaker 10 comprising a basket type centrifugal separator where the foam is broken. Thus, a concentrated solution 12 was obtained. $Na_2SO_4$ was continuously added to the concentrated solution so that the solution had a concentration of 200 ppm. The concentrated solution was supplied by the pump 15 to a 30 l stainless steel pressure/heating separation tank 16 so that it retained for 30 minutes in the pressure/heating separation tank.

The solution was heated by a steam of 10 kg/cm² so as to keep a solution temperature in the separation tank 16 at 130° C. The solution was subjected to a pressure/heating treatment and separated into the nonionic surface active agent solution 20 and a separated water 17 which in turn were supplied to flash tanks 21 and 18 where the respective liquids were returned to atmospheric pressure. The separated water was recycled to the foam separation tower 4 and the surface active agent solution (recover solution) was recovered. After a 6-hour continuous treatment, measurement was made of the concentration of a nonionic surface active agent in the treated water, separated water and recovery solution. The results are shown in Table 1.

CONTROL 1

The waste water (sample 2) in Example 1 was treated in the same manner as in Example 1 to obtain a treated water and a foamed concentrated solution. 500 ml of the foamed concentrated solution was introduced into a 1 l glass beaker and it was heated for 30 minutes at 97° C under atmospheric pressure. Thereafter it was allowed to stand for 30 minutes. Even after 30 minutes the concentrated solution showed any sign of change and a nonionic surface active agent was not able to be separated.

When $Na_2SO_4$ was added to the concentrated solution so as to attain a 5% concentration, the nonionic surface active agent was separated, but the separation speed was very slow and 90 minutes was required for separation. Measurement was made of the concentration of a nonionic surface active agent in a separated water (an upper layer) and a recovery solution (a lower layer), the results of which are also shown in Table 1.

Table 1

| Experiment No. | original water ppm/l/hr | supply to foam separation tank ppm/l/hr | treated water ppm/l/hr | concentrated solution ppm/l/hr | separated water ppm/l/hr | recovery solution %/l/hr |
|---|---|---|---|---|---|---|
| 1 | 20/300 | 26/306.44 | 0.4/299.99 | 1200/6.45 | 292/6.44 | 91.5/0.0064 |
| 2 | 100/300 | 107.3/312.68 | 0.9/299.97 | 2605/12.71 | 280/12.68 | 92.2/0.032 |
| 3 | 400/300 | 391/326.28 | 2.4/299.87 | 4810/26.41 | 288/26.28 | 91.9/0.13 |
| Example 3 | 100/300 | 107.9/312.48 | 0.9/299.97 | 2650/12.51 | 297/12.48 | 92.0/0.032 |
| Control 1 | 100/— | — | 0.9/— | 2605/(500ml) | 915/(498.24ml) | 48.2/(1.76ml) |

Note that an upper numerical figure in each row of Table 1 shows the content (ppm) of the nonionic surface active agent of each liquid and a lower numerical figure in each row of Table 1 shows a rate of flow (l/hr) of each liquid (in Control 1 a lower numerical figure shows an amount of liquid (ml)).

As will be evident from Table 1 the separated water of this invention can be immediately added to the waste water for recycle. In Control 1, however, even when a greater amount of inorganic electrolyte was added to the waste water, a nonionic surface active agent in the recovery solution shows a low degree of purity and difficulty is encountered in utilizing the recovery solution for reuse. The Control 1 also shows a low separation efficiency. Furthermore, when the separated water is recycled to the foam separation process, foam separation efficiency is also lowered.

According to this invention, a treatment time is shorter than in the prior art and a quantity of heat required for a heating can be reduced. Furthermore, a manufacturing device can be made compact.

EXAMPLE 2

A waste water containing 100 ppm of a nonionic surface active agent was treated in the same manner as in Example 1, except that a different kind of nonionic surface active agent was used in the waste water and that a different heating temperature was used in the pressure/heating process. The results are shown in Table 2.

Table 2

| Experiment No. | nonionic surface active agent | original water ppm/l/hr | supply to pressure/ heating tank ppm/l/hr | treated water ppm/l/hr | concentrated solution ppm/l/hr | separated water ppm/l/hr | recovery solution %/l/hr |
| --- | --- | --- | --- | --- | --- | --- | --- |
| 4 | R—⟨⟩—O(C$_2$H$_4$O)$_n$H (C in R = 9, n = 9) | 100/ 300 | 101.6/ 312.09 | 1.0/ 299.97 | 2590/ 12.12 | 142/ 12.09 | 93.1/ 0.032 |
| 5 | R—⟨⟩—O(C$_2$H$_4$O)$_n$H (C in R = 9, n = 30) | 100/ 300 | 111.6/ 316.02 | 0.8/ 299.97 | 2200/ 16.05 | 330/ 16.02 | 91.0/ 0.033 |
| 6 | R—O(C$_2$H$_4$O)$_n$H (C in R = 12, n = 20) | 100/ 300 | 107/ 309.69 | 1.4/ 299.97 | 3409/ 9.72 | 324/ 9.69 | 90.7/ 0.033 |
| 7 | R—COO(C$_2$H$_4$O)$_n$H (C in R = 17, n = 20) | 100/ 300 | 101.9/ 308.54 | 2.1/ 299.97 | 3604/ 8.58 | 170/ 8.54 | 92.0/ 0.032 |

Note:
See Note in Table 1.

For the Experiment Nos. 6 and 7 shown in Table 2 pipings connected to the flash tanks were exchanged, since a separated nonionic surface active agent is floated. That is, the flash tank 18 was connected to the bottom of the separation tank 16 and the flash tank 21 was connected to the upper side of the separation tank 16.

EXAMPLE 3

200 ppm of CaCl$_2$ were added, in place of Na$_2$SO$_4$ of an inorganic electrolyte in Example 1, to a waste water (sample 2) in Example 1 and the same treatment as in Example 1 was effected, the results of which are shown in Table 1.

EXAMPLE 4

Na$_2$SO$_4$ was added to the same waste water (containing 5200 ppm of a nonionic surface active agent) as in Example 1 so that the latter contained 200 ppm of Na$_2$SO$_4$. The waste water was supplied at a rate of 300 l/hr in a stainless steel pressure/heating separation tank 16 having a capacity of 150 l where it was heated by a steam of 10 kg/cm$^2$ to 140° C. A concentrated solution and a separated water were removed, which being continuously flashed, and the concentrated solution was recovered. The separated water underwent a heat exchange with the waste water to be treated and then it was supplied to the foam separation tank where it was separated into a treated water and a concentrated solution in which the nonionic surface active agent was concentrated. The treated water was discharged and the concentrated solution was recycled to the pressure/heating separation tank. After a 6-hour continuous treatment measurement was made of the concentration of each nonionic surface active agent, the results of which are shown in Table 3.

EXAMPLE 5

AlCl$_3$ was added to a waste water containing 2210 ppm of a nonionic surface active agent [R— O(C$_2$H$_4$O)$_9$H provided that C in R=9] and 82 ppm of sodium salt of linear alkylbenzene sulfonate so that the waste water contained 500 ppm of AlCl$_3$. The same treatment as in Example 4 was conducted. The results are shown in Table 3.

Table 3

| Example No. | original water ppm/l/hr | supply to foam separation tank ppm/l/hr | treated water ppm/l/hr | concentrated solution ppm/l/hr | separated water ppm/l/hr | recovery solution %/l/hr |
| --- | --- | --- | --- | --- | --- | --- |
| 4 | 5200 ppm/ 300l/hr | 5099/ 323.69 | 1.2/ 298.29 | 3820/ 23.69 | 282/ 321.98 | 91.2/1.71 |
| 5 | 2210/ 300 | 2184/ 318.10 | 2.8/ 299.28 | 1760/ 18.10 | 103/ 317.38 | 91.5/0.72 |

Note: See note in Table 1

According to this invention the nonionic surface active agent in the waste water can be effectively eliminated, by the synergistic effect of the foam separation process and pressure/heating process, without using a greater amount of heat source and inorganic electrolyte. Furthermore, the recovered nonionic surface active agent can be concentrated to an extent far unattainable by a conventional method. The treated water can be also obtained in high yield to the extent utilizable as a contamination-free industrial water, and the treatment is very easily made according to this invention.

What we claim is:

1. A method for recovering a nonionic surface active agent from a nonionic surface active agent containing waste water to purify the waste water, which consists of separating by a foam separation step a low concentration waste water with less than 500 ppm of a nonionic surface active agent into a concentrated water containing more than 500 ppm of nonionic surface active agent and a treated water containing less than 3 ppm of nonionic surface active agent; adding an inorganic electrolyte selected from the group consisting of Na$_2$SO$_4$, K$_2$SO$_4$, Al$_2$(SO$_4$)$_3$, Fe$_2$(SO$_4$)$_3$, NaCl, KCl, CaCl$_2$, MgCl$_2$, FeCl$_2$, FeCl$_3$ and AlCl$_3$ to the concentrated water to insure a concentration of electrolyte in the concentrated water of more than 50 ppm, heating the resultant concentrated water containing electrolyte to 100° to 200° C under a pressure of 2 to 5 kg/cm$^2$ to separate it into a high concentration nonionic surface active agent solution and a separated water, and recycling the separated water to the foam separation step, said nonionic surface active agent being selected from the group consisting of polyoxyethylenealkylether represented by a general formula:

RO—(CH$_2$—CH$_2$—O)$_n$H, polyoxyethylenealkylphenylether represented by a general formula:

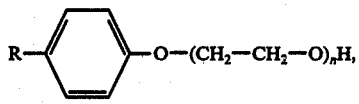

and fatty ester of polyethyleneglycol represented by a general formula:

R—COO—(CH$_2$—CH$_2$—O)$_n$H, where R denotes C$_6$ to C$_{24}$ alkyl radical or alkenyl radical and n denotes 2 to 40.

2. A method according to claim 1 in which said inorganic electrolyte is selected from the group consisting of Na$_2$SO$_4$, CaCl$_2$ and AlCl$_3$.

3. A method according to claim 1 in which the resultant concentrated water containing the inorganic electrolyte is heated at 120° to 150° C.

4. A method according to claim 1 wherein the separated water is mixed with the low concentration waste water before recycling the separated water to the foam separation step.

5. A method according to claim 1 in which 50 to 500 ppm of inorganic electrolyte is added to the concentrated water to insure a concentration of electrolyte in the concentrated water of more than 50 ppm.

* * * * *